United States Patent
Chiba

(10) Patent No.: US 10,599,370 B2
(45) Date of Patent: Mar. 24, 2020

(54) IMAGE PROCESSING APPARATUS CAPABLE OF CANCELING A JOB, METHOD FOR CONTROLLING IMAGE PROCESSING APPARATUS, AND RECORDING MEDIUM

(71) Applicant: CANON KABUSHIKI KAISHA, Tokyo (JP)

(72) Inventor: Shinichi Chiba, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/900,593

(22) Filed: Feb. 20, 2018

(65) Prior Publication Data
US 2018/0246681 A1    Aug. 30, 2018

(30) Foreign Application Priority Data

Feb. 24, 2017    (JP) ................................ 2017-033707

(51) Int. Cl.
*G06F 21/44*    (2013.01)
*G06F 3/12*    (2006.01)

(52) U.S. Cl.
CPC ............ *G06F 3/121* (2013.01); *G06F 3/1234* (2013.01); *G06F 3/1238* (2013.01); *G06F 3/1285* (2013.01); *G06F 3/1255* (2013.01); *G06F 3/1274* (2013.01)

(58) Field of Classification Search
CPC ...... G06F 3/121; G06F 3/1234; G06F 3/1238; G06F 3/1274
USPC ............................................. 358/1.14, 1.13
See application file for complete search history.

(56) References Cited

U.S. PATENT DOCUMENTS

2005/0183141 A1*  8/2005  Sawada .................. G03G 21/04
                                                          726/16
2014/0233053 A1*  8/2014  Kakutani .............. G06F 3/1222
                                                          358/1.14

FOREIGN PATENT DOCUMENTS

JP          2005-262864 A        9/2005

* cited by examiner

*Primary Examiner* — Jamares Q Washington
(74) *Attorney, Agent, or Firm* — Canon U.S.A., Inc. IP Division

(57) ABSTRACT

An image processing apparatus performs control of accepting an instruction to cancel execution of a job on condition that authentication using authority information input to the image processing apparatus has succeeded, in a case where a predetermined error has not occurred. The image processing apparatus performs control of accepting the instruction to cancel the execution without the authority information input with respect to only a specific job among jobs generated by the image processing apparatus, in a case where the predetermined error has occurred.

17 Claims, 9 Drawing Sheets

IMAGE PROCESSING APPARATUS CAPABLE OF CANCELING A JOB, METHOD FOR CONTROLLING IMAGE PROCESSING APPARATUS, AND RECORDING MEDIUM

BACKGROUND

Field of the Disclosure

The present disclosure relates to control for canceling image processing ongoing in an image processing apparatus.

Description of the Related Art

Conventionally, there has been known a system configured to request user authentication at the time of canceling a print job to be carried out by an image processing apparatus.

An image forming apparatus discussed in Japanese Patent Application Laid-Open No. 2005-262864, if authentication information added to print data received by the image forming apparatus and authentication information input from an operation unit of the image forming apparatus match each other, permits canceling of processing for printing the print data.

Further, the image forming apparatus discussed in Japanese Patent Application Laid-Open No. 2005-262864 permits not only an authenticated user but also a user having authority to perform an operation for eliminating an error to cancel the print processing so as to allow the print processing to be canceled even while the authenticated user corresponding to the authentication information added to the print data is absent.

SUMMARY

In some cases, for example, an error may occur during the print processing, and the error state of the image processing apparatus may be unable to be resolved unless the print processing is canceled. However, according to the image forming apparatus discussed in Japanese Patent Application Laid-Open No. 2005-262864, a user having neither the authentication information nor the authority to perform the operation for eliminating the error cannot cancel the print processing. Therefore, the error state cannot be resolved and the image forming apparatus cannot be used while both the user corresponding to the authentication information added to the print data and the user having the authority to perform the operation for eliminating the error are absent.

On the other hand, if the image forming apparatus is configured to allow the user having neither the authentication information nor the authority to perform the operation for eliminating the error to cancel execution of all print processing procedures that the image forming apparatus is performing, any time, this is equivalent to unintentionally ignoring a purpose for necessitating the predetermined authority for canceling the print processing.

Some embodiments of an image processing apparatus that will be described below include the following configuration to solve the above-described issues. That is, some embodiments of the image processing apparatus include a memory device that stores a set of instructions, and at least one processor that executes the set of instructions to receive an instruction to perform image processing, generate a job for performing the image processing, input authority information, perform control of accepting an instruction to cancel execution of the generated job on condition that authentication using the input authority information has succeeded in a case where a predetermined error has not occurred, perform control of accepting the instruction to cancel the execution without the authority information input with respect to only a specific job among the generated job(s) in a case where the predetermined error has occurred, and cancel the execution of the job for which the cancel instruction is accepted.

Further features of the present disclosure will become apparent from the following description of exemplary embodiments with reference to the attached drawings.

DESCRIPTION OF THE EMBODIMENTS

In the following description, exemplary embodiments will be described with reference to the drawings.

Figure 1:
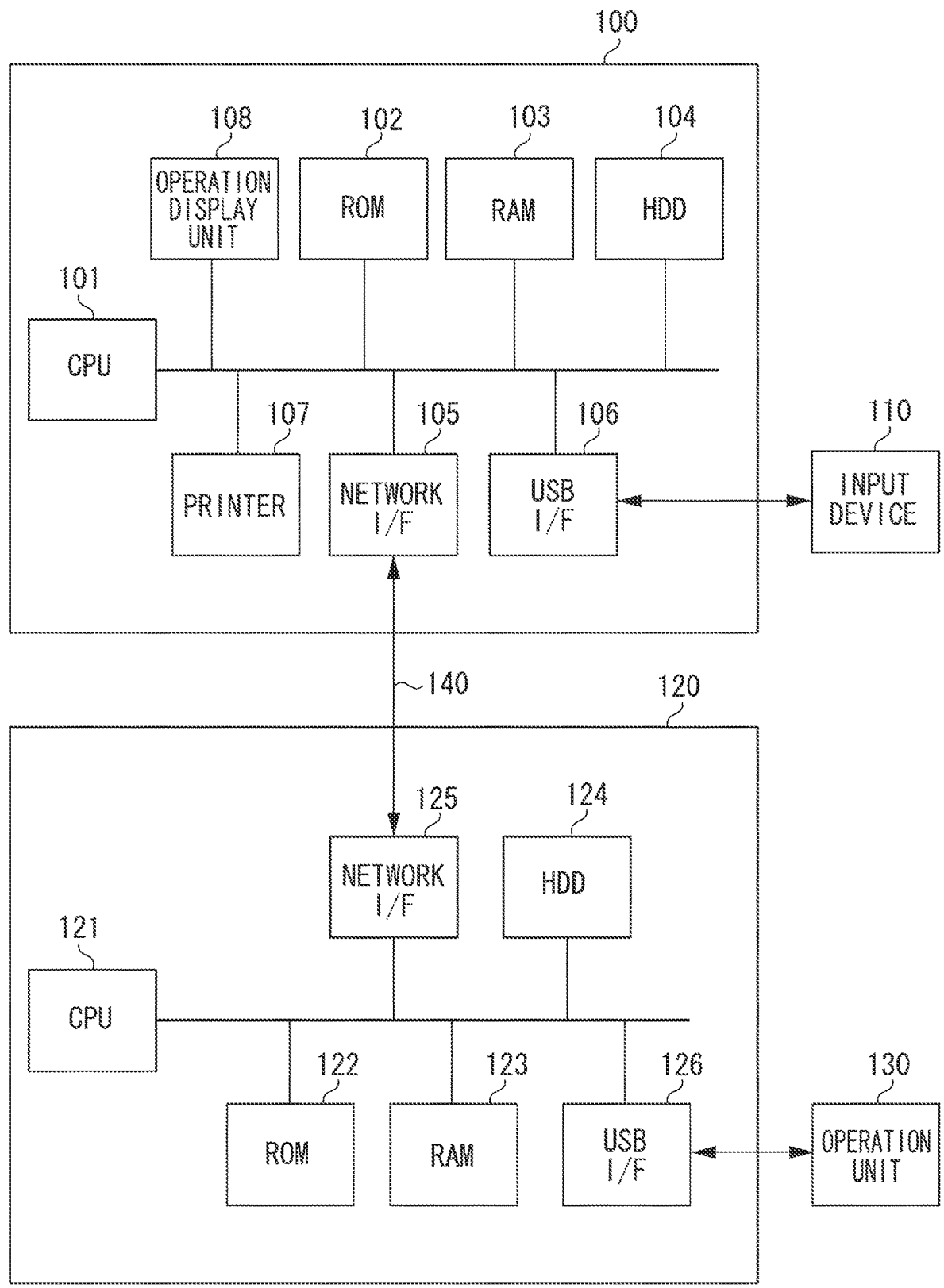
FIG. 1 illustrates a configuration of an image processing system according to a first exemplary embodiment.

A configuration of an image processing system according to a first exemplary embodiment will be described with reference to FIG. 1. In the image processing system according to the present exemplary embodiment, an image processing apparatus 100 and a terminal apparatus 120 are connected to each other via a local area network (LAN) 140. The LAN 140 may be a LAN for carrying out wired communication (a wired LAN) or may be a LAN for carrying out wireless communication (a wireless LAN). The image processing system may be configured in such a manner that the image processing apparatus 100 and the terminal apparatus 120 are connected to each other via not only the LAN but also a wide area network (WAN) such as the Internet or a network constructed by combining the WAN and the LAN.

(Configuration of Image Processing Apparatus 100)

First, a configuration of the image processing apparatus 100 will be described. In the present exemplary embodiment, the image processing apparatus 100 operates as an image forming apparatus that performs print processing. The image processing apparatus 100 may be configured to perform not only the print processing but also scan processing for reading out an image from an original document to generate image data, transmission processing for transmitting the scanned image via the network, and/or the like.

A central processing unit (CPU) 101 controls an operation of each of component units of the image processing apparatus 100. The CPU 101 controls the image processing apparatus 100 by loading a program stored in a read only memory (ROM) 102 into a random access memory (RAM) 103 and executing the developed program. Further, the RAM 103 is used as a storage unit temporarily storing therein a job that the image processing apparatus 100 carries out.

A hard disk drive (HDD) 104 stores therein setting information used for the image processing apparatus 100 to operate. Further, in the present exemplary embodiment, the HDD 104 stores therein user's authentication information used for the CPU 101 to perform authentication processing. In the present exemplary embodiment, the authentication processing will be described based on an example in which the CPU 101 authenticates a user by comparing user's authentication information input from an input device 110 such as an integrated circuit (IC) card reader and the authentication information stored in the HDD 104.

The configuration for the user authentication is not limited thereto. The image processing system may be configured in such a manner that a not-illustrated authentication server is connected to the image processing apparatus 100 and the authentication server performs the authentication processing. In this case, the CPU 101 performs control of requesting execution of the user authentication processing from the authentication server along with transmitting the user's authentication information input from the input device 110 to the authentication server. The image processing apparatus 100 may be configured to acquire an authentication result as a response to the request. The input device 110 may be configured to be built in the image processing apparatus 100.

Further, the content of the authentication processing is not limited to the example in which the user's authentication information input from the input device 110 and the authentication information stored in the HDD 104 are compared with each other. The authentication processing may be performed as processing that determines that the authentication has succeeded if user's authentication information contained in print data transmitted from the terminal apparatus 120 and the user's authentication information input from the input device 110 match each other.

A network interface (I/F) 105 transmits/receives data between the image processing apparatus 100 and the terminal apparatus 120 via the LAN 140. The network I/F 105 receives the print data from the terminal apparatus 120. Further, the network I/F 105 receives an instruction to perform image processing from the terminal apparatus 120. The network I/F 105 may be configured to carry out the communication via the WAN as described above.

A Universal Serial Bus (USB) I/F 106, for example, connects to, communicates with, and supplies power to the input device 110. The USB I/F 106 operates as an input unit that inputs the authentication information (authority information) to the image processing apparatus 100. The authentication information includes identification information of the user, a password for authenticating the user, and the like.

A printer 107 records the print data received from the terminal apparatus 120 via the network I/F 105 or print data stored in a storage unit on recording paper. The printer 107 operates as a processing unit that carries out a print job generated based on the received print data.

The image processing apparatus 100 may be configured to include, for example, a scanner unit that inputs an image, besides the printer 107. In the present exemplary embodiment, the job refers to a task (work) in which one set of processing procedures is performed. The CPU 101 generates the job based on data received from the terminal apparatus 120.

For example, the CPU 101 generates the print job based on the print data received from the terminal apparatus 120. The print job refers to a task in which one set of processing procedures for recording and outputting the print data on the recording paper is performed. Further, the print data may include not only image data targeted for the printing but also, for example, the user's identification information and authentication information or print restriction information.

An operation display unit 108 receives various kinds of operations to be performed by the user, displays an operation screen, and notifies the user. The operation display unit 108 includes, for example, a display unit 301, a selection request button 302, and an operation button 303. In the present exemplary embodiment, the operation display unit 108 displays a job selection screen 304, which will be described below. The display unit 301 may be constructed as a touch panel and configured to receive a selection of the job via the job selection screen 304.

The input device 110 reads out the user's authentication information from an IC card, an information terminal, or the like holding the authentication information therein, and transmits the read information to the image processing apparatus 100 via the USB I/F 106. The input device 110 may be configured to be built in the image processing apparatus 100.

(Configuration of Terminal Apparatus 120)

Next, the terminal apparatus 120 will be described. The terminal apparatus 120 is an information processing apparatus such as a personal computer (PC).

A CPU 121 controls an operation of each of component units of the terminal apparatus 120 by loading a program stored in a ROM 122 into a RAM 123 and executing the developed program. An HDD 124 stores therein, for example, setting information used for the terminal apparatus 120 to operate.

A network I/F 125 transmits/receives data between the terminal apparatus 120 and the image processing apparatus 100 via the LAN 140. The network I/F 125 transmits the print data to the image processing apparatus 100. Further, the network I/F 125 transmits the instruction to perform the image processing to the terminal apparatus 120. The network I/F 125 may be configured to carry out the communication via the WAN as described above.

A USB I/F 126, for example, connects to and communicates with an operation unit 130. The USB I/F 126 operates as an input unit that inputs an operation instruction transferred from the operation unit 130 to the terminal apparatus 120. The operation unit 130 can be, for example, a mouse and/or a keyboard. The operation unit 130 may be configured to be built in the terminal apparatus 120. For example, the terminal apparatus 120 may be configured to include a touch panel and receive the operation instruction via the touch panel.

In the present exemplary embodiment, the terminal apparatus 120 can transmit instructions to perform two types of print processing to the image processing apparatus 100.

First print processing is processing for, after the image processing apparatus 100 receives the print data, causing the image processing apparatus 100 to print the print data on condition that the user authentication has succeeded in the image processing apparatus 100.

Second print processing is processing for causing the image processing apparatus 100 to print the print data without the user authentication carried out in the image processing apparatus 100 after the image processing apparatus 100 receives the print data.

When causing the image processing apparatus 100 to perform, for example, the first print processing, the terminal apparatus 120 transmits the print data to the image processing apparatus 100 after adding information indicating that the user authentication is necessary to print the print data, to the print data. The information indicating that the user authentication is necessary may be predetermined bit information or may be realized in such a manner that the image processing apparatus 100 is caused to perform the first print processing if the user's authentication information is contained in the print data. Alternatively, the terminal apparatus 120 may be configured to add information indicating that the user authentication is unnecessary, to the print data when causing the image processing apparatus 100 to perform the second print processing.

(Software Configuration of Image Processing Apparatus)

Figure 2:
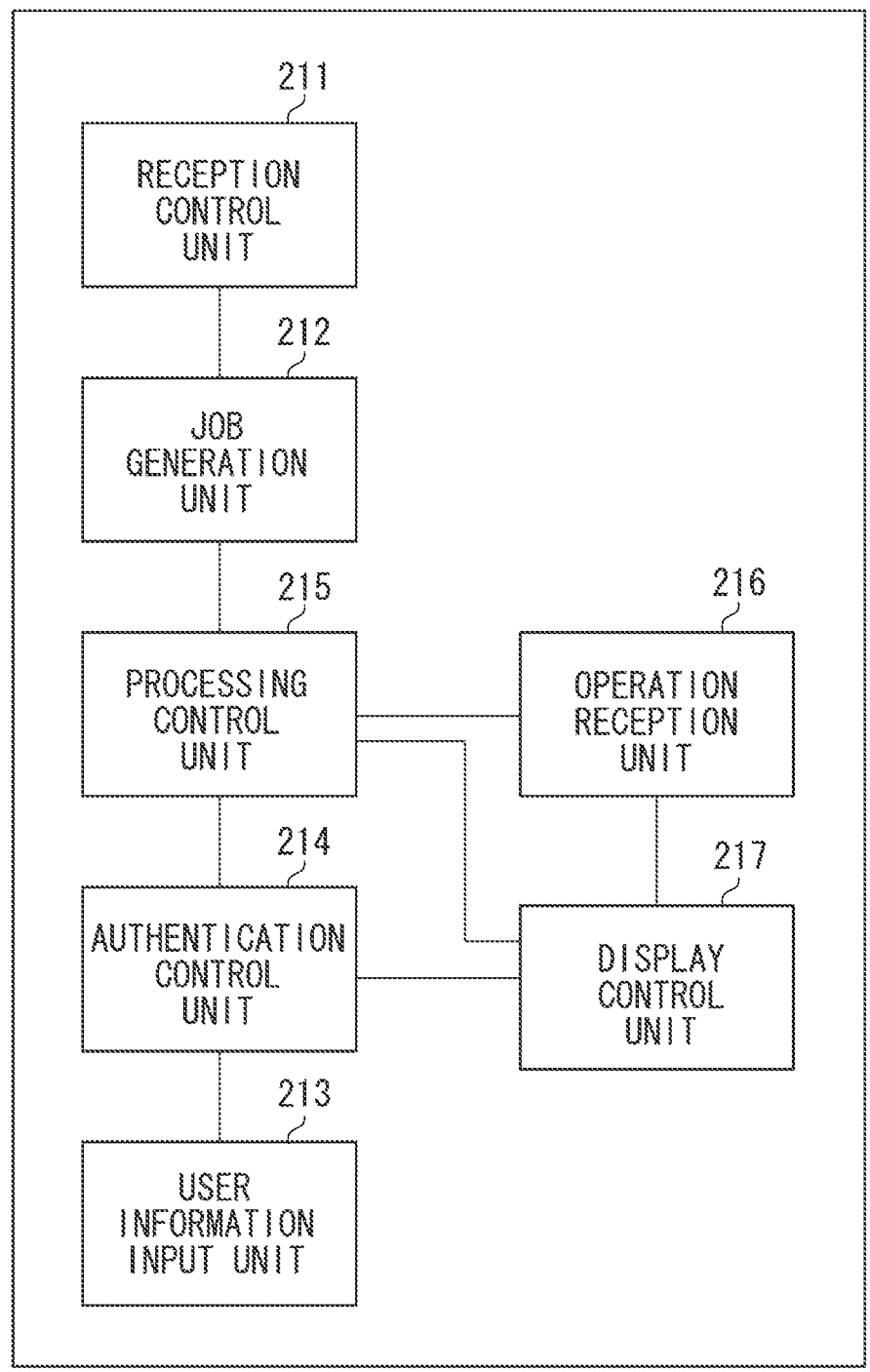
FIG. 2 illustrates a configuration of functional modules of an image processing apparatus.

Next, a software configuration of the image processing apparatus 100 will be described with reference to FIG. 2. Each of configurations illustrated in FIG. 2 indicates a functional module that the CPU 101 realizes by executing the program stored in the ROM 102. However, the image processing apparatus 100 may be configured to realize a part or all of the configurations illustrated in FIG. 2 by means of hardware.

A reception control unit 211 performs control of receiving the instruction to perform the image processing. The reception control unit 211 instructs a job generation unit 212 to generate the job upon receiving the instruction to perform the image processing.

The job generation unit 212 generates the job for performing the image processing that the image processing apparatus 100 is instructed to perform. The job generation unit 212 stores the generated job into the RAM 103.

A user information input unit 213 inputs the user's authentication information received from the input device 110 to an authentication control unit 214.

The authentication control unit 214 performs the authentication processing by comparing the input user's authentication information and the user's authentication information stored in the HDD 104. In the present exemplary embodiment, the authentication control unit 214 determines that the authentication has succeeded if the input user's authentication information and the user's authentication information stored in the HDD 104 match each other. The success in the user authentication allows the image processing apparatus 100 to permit the user to log into the image processing apparatus 100 and instruct the image processing apparatus 100 to cancel the ongoing job.

The user's authentication information stored in the HDD 104 is authority information for identifying a user having authority to log into the image processing apparatus 100 and operate the image processing apparatus 100. Further, in the present exemplary embodiment, the user's authentication information stored in the HDD 104 is authority information for identifying a user having authority to cancel the job that the image processing apparatus 100 is carrying out.

The authority to log into the image processing apparatus 100 and the authority to cancel the job may be integrated authority or may be managed as individual different authority rights. In other words, the user having the login authority may also have the authority to cancel the job. Alternatively, the user having the login authority and the user having the authority to cancel the job may be separately managed.

A processing control unit 215 performs control of causing the printer 107 to carry out the job. Further, the processing control unit 215 performs control of causing the printer 107 to cancel the ongoing job.

If the job generated by the job generation unit 212 is a job requiring the success in the user authentication as a condition for starting carrying out the job, the processing control unit 215 causes the printer 107 to carry out the job according to an authentication success notification from the authentication control unit 214.

On the other hand, if the job generated by the job generation unit 212 is a job that does not require the success in the user authentication as the condition for starting carrying out the job, the processing control unit 215 causes the printer 107 to carry out the job without receiving the authentication success notification from the authentication control unit 214.

Further, when the image processing apparatus 100 is instructed to cancel the job selected via the job selection screen 304 displayed by a display control unit 217, the processing control unit 215 cancels the execution of the selected job.

An operation reception unit 216 causes the display control unit 217 to display the job selection screen 304 or a job selection screen 401 when a predetermined operation key (for example, the selection request button 302) in the operation display unit 108 is operated by the user. In the present exemplary embodiment, a selection request input by pressing the selection request button 302 means an instruction to display the job selection screen 304 or 401. In the present exemplary embodiment, the predetermined operation key on the selection screen 304 or 401 may be a hardware key or may be a software key displayed on the display unit 301. Further, the operation reception unit 216 receives the instruction to cancel the job selected via the job selection screen 304. Upon receiving the instruction to cancel the job, the operation reception unit 216 causes the processing control unit 215 to perform the control of canceling the job.

The display control unit 217 causes the job selection screen 304 or 401 for selecting a job from one or more job(s) held by the image processing apparatus 100 to be displayed on the display unit 301 in the operation display unit 108.

In the present exemplary embodiment, the display control unit 217 causes the job selection screen 304 to be displayed if the selection request button 302 is pressed when the authenticated user logs into the image processing apparatus 100 in normal times (when a predetermined error has not occurred). The display control unit 217 does not cause the job selection screen 304 to be displayed even when the selection request button 302 is pressed if the authenticated user does not log into the image processing apparatus 100 in normal times.

On the other hand, the display control unit 217 causes the job selection screen 304 or 401 to be displayed on the display unit 301 regardless of whether the user authentication has succeeded when the predetermined error has occurred in the image processing apparatus 100. The display control unit 217 can determine whether the predetermined error has occurred by, for example, referring to an error code indicating a type of an error that has occurred in the image processing apparatus 100. The predetermined error is, for example, a sheet size mismatch error or a sheet empty error. The sheet size mismatch error refers to an error that occurs when a size of a sheet required to carry out the job and a size of a sheet that the image processing apparatus 100 can feed do not match each other. The content of the error is not limited to these examples. In the present exemplary embodiment, the predetermined error is defined to be such an error that, unless the execution of the job that has caused the occurrence of the error is canceled, the error is not resolved.

In the present exemplary embodiment, when causing the job selection screen 304 or 401 to be displayed, the display control unit 217 displays a list of different jobs according to the result of the authentication under the control by the authentication control unit 214. Respective display examples of the job selection screens 304 and 401 by the display control unit 217 will be described with reference to FIGS. 3 and 4.

Figure 3:
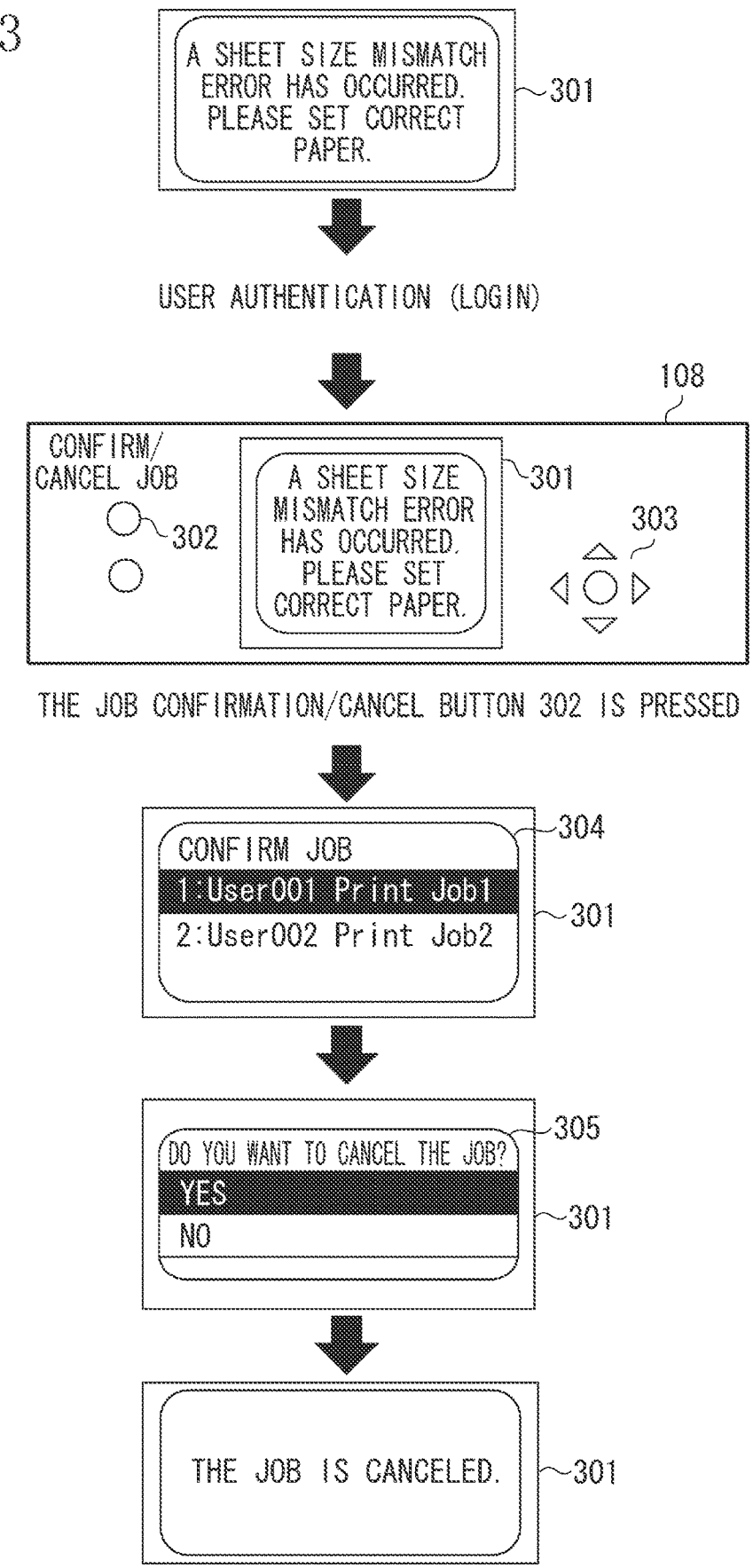
FIG. 3 illustrates a flow of processing for canceling execution of a job in an authenticated state.

FIG. 3 illustrates an example in a case where the user having the login authority requests the user authentication and logs into the image processing apparatus 100 after the predetermined error has occurred. The example illustrated in FIG. 3 will be described based on an example in which the image processing apparatus 100 holds a job 1 and a job 2 and the sheet size mismatch error has occurred during execution of the job 1.

When the sheet size mismatch error has occurred, a message indicating that the sheet size mismatch error has occurred is displayed on the display unit 301. After that, when the user logs into the image processing apparatus 100 and presses the selection request button 302, the list of jobs held by the image processing apparatus 100 is displayed on the display unit 301. The job 1, which has caused the occurrence of the sheet size mismatch error, and the job 2, which is unrelated to the occurrence of the sheet size mismatch error, are displayed on the job selection screen 304.

The user selects the job 1, which has caused the occurrence of the error, among the jobs displayed on the job selection screen 304 by operating the operation button 303 in the operation display unit 108. When the job 1 is selected, a confirmation screen 305 for confirming whether to stop (cancel) the execution of the job 1 is displayed on the display unit 301. When the user enters the cancel of the execution of the job 1 by operating the operation button 303, the execution of the job 1 is canceled. In this manner, the error state of the image processing apparatus 100 can be resolved.

Figure 4:
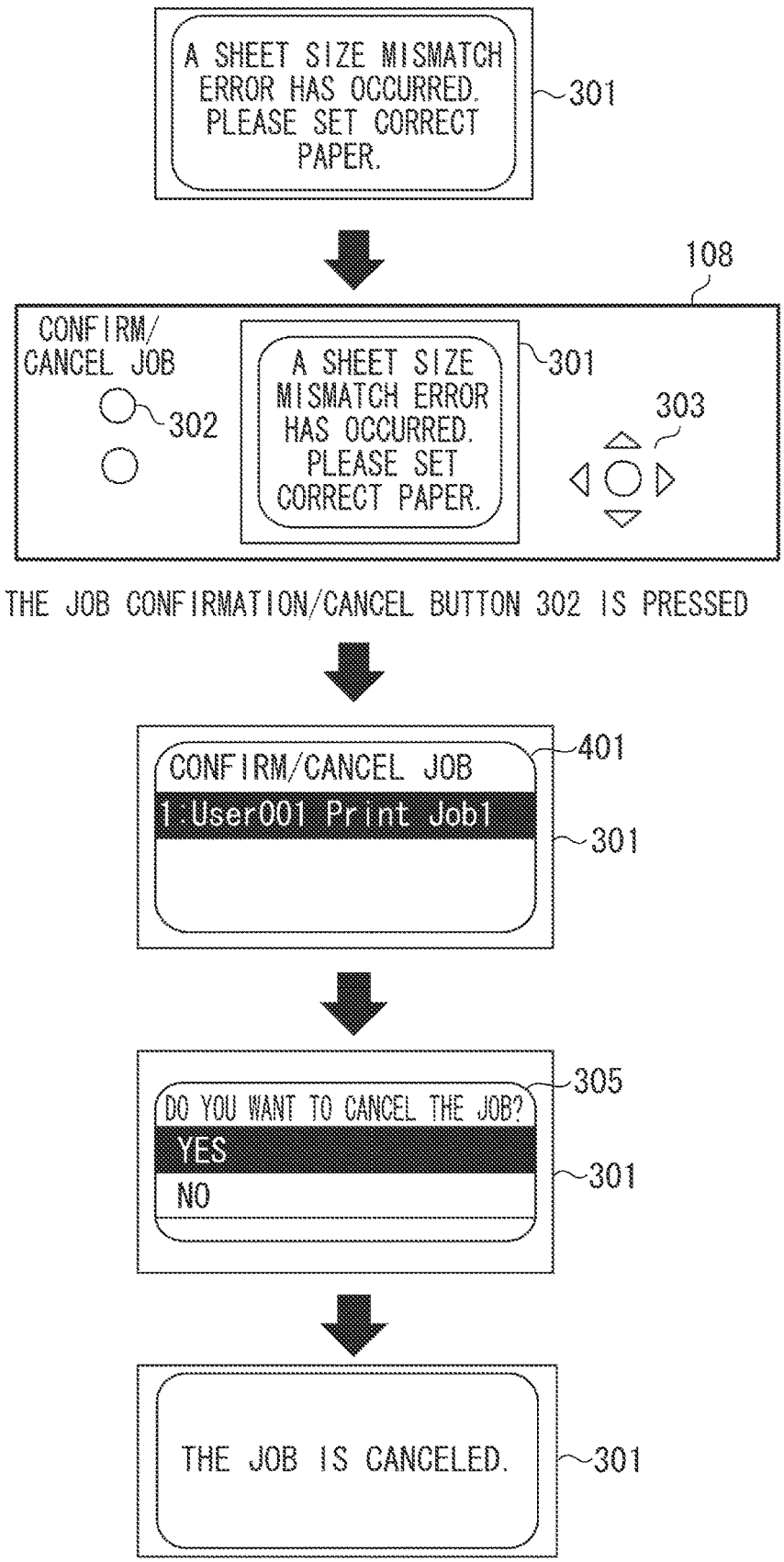
FIG. 4 illustrates a flow of processing for canceling the execution of the job in an unauthenticated state.

Next, an example in which the processing for canceling the execution of the job is performed without the authentication information input by the user after the predetermined error has occurred will be described with reference to FIG. 4. Now, the example illustrated in FIG. 4 will be described based on the example in which the image processing apparatus 100 holds the job 1 and the job 2 and the sheet size mismatch error has occurred during the execution of the job 1, similarly to the example illustrated in FIG. 3.

When the selection request button 302 is pressed without the authentication information input after the sheet size mismatch error has occurred, the job selection screen 401 is displayed on the display unit 301. In the present exemplary embodiment, only the job 1 of the job 1 and the job 2 held by the image processing apparatus 100, which has caused the occurrence of the sheet size mismatch error, is displayed on the job selection screen 401. A method of identifying the job that has caused the occurrence of the error is not especially limited. For example, a job in progress at the moment that the error has occurred, or a job placed at a head of a queue holding the jobs at the moment that the error has occurred can be displayed on the job selection screen 401 as the job that has caused the occurrence of the error.

After that, similarly to the example illustrated in FIG. 3, the user selects the job 1 and causes the image processing apparatus 100 to cancel the execution of the job 1, by which the execution of the job 1 is canceled and the error state of the image processing apparatus 100 can be resolved.

In this manner, the instruction to cancel the execution of the job can be issued without the authentication information input if the cancel is attempted for a purpose of resolving the predetermined error that has occurred in the image processing apparatus 100. Therefore, the present configuration can prevent the image processing apparatus 100 from undesirably becoming unusable while the user having the authentication information is absent when the error has occurred.

Further, the present configuration can prevent the execution of the job from being canceled in an unauthorized manner for a purpose other than the purpose of resolving the error. The present configuration allows only the job corresponding to the occurrence of the error among the one or more job(s) generated by the image processing apparatus 100 to be selected from the job selection screen 401 if the authentication information is not input, even when the cancel is attempted for the purpose of resolving the predetermined error. Therefore, the present configuration can limit the job cancelable without the authority information input among the one or more job(s) generated by the image processing apparatus 100, even when the cancel is attempted for the purpose of resolving the predetermined error. For example, the present configuration can allow the job from which the error has occurred to be canceled without the authentication information input but prevent a job other than that from being canceled without the authentication information input.

(Description of Operation of Image Processing Apparatus 100)

Figure 5:
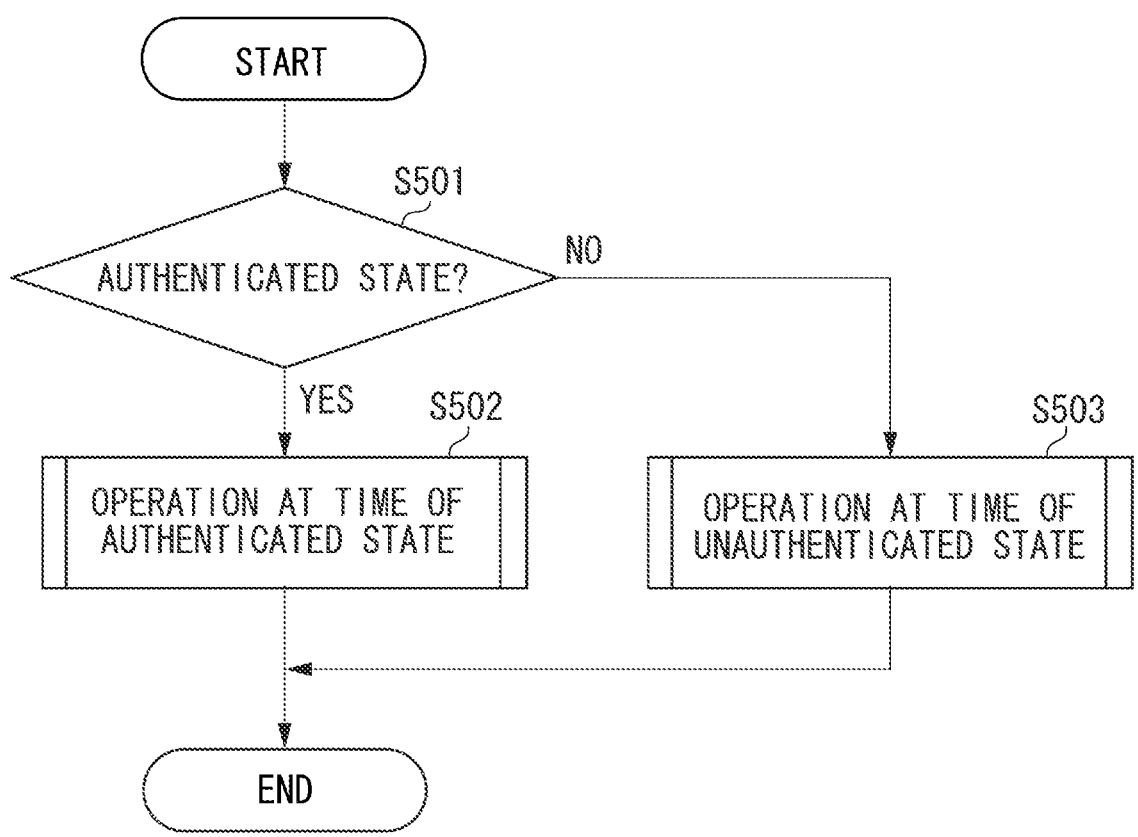
FIG. 5 illustrates a flow of processing to be performed by the image processing apparatus.
Figure 6:
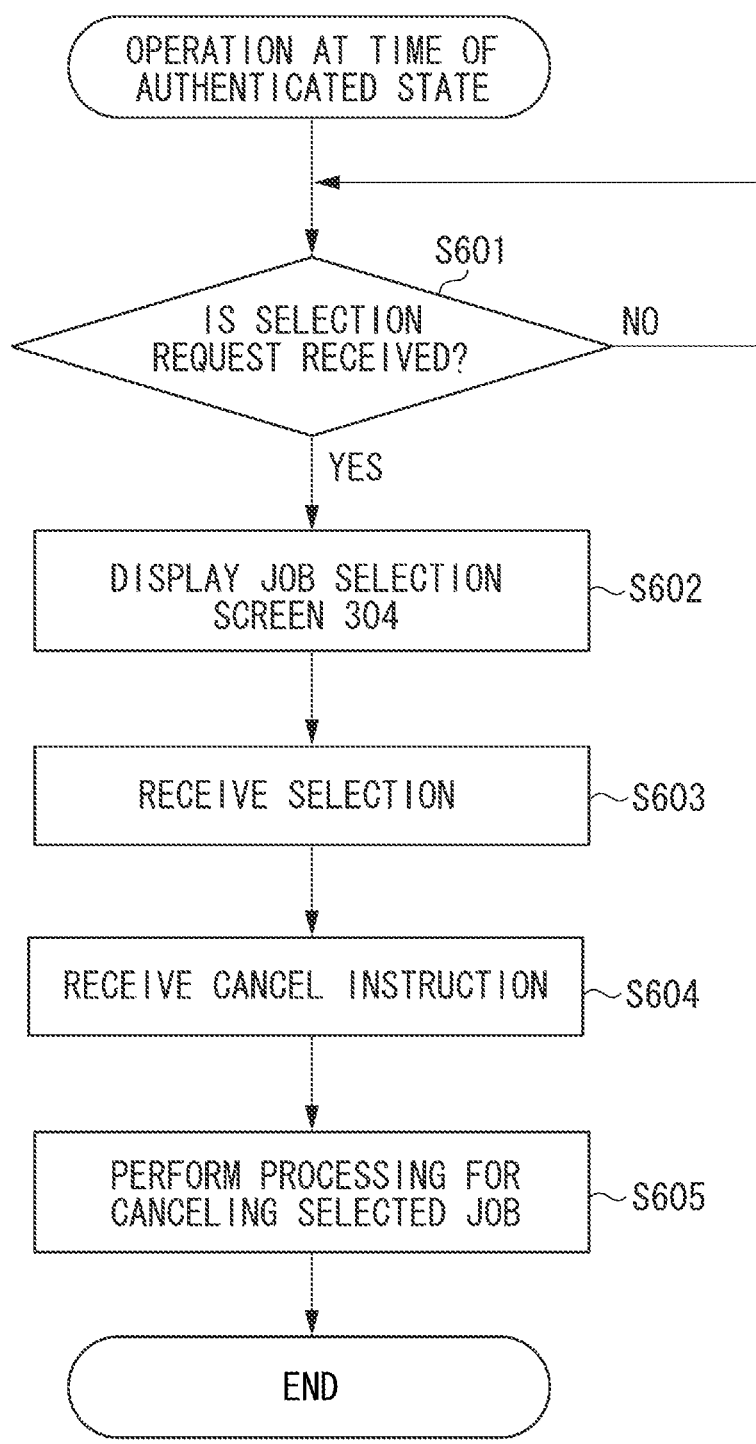
FIG. 6 illustrates a flow of processing to be performed by the image processing apparatus in the authenticated state.
Figure 7:
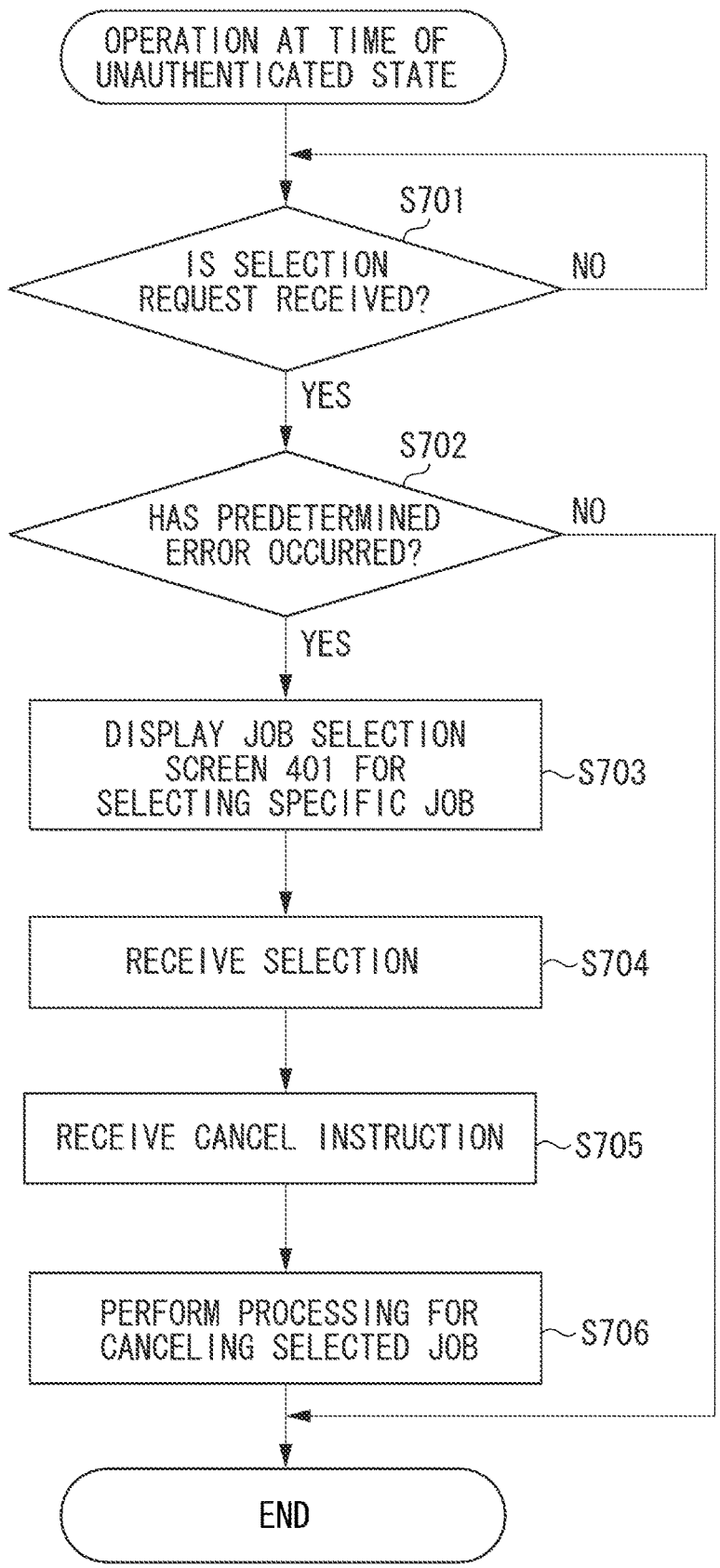
FIG. 7 illustrates a flow of processing performed to be by the image processing apparatus in the unauthenticated state according to a first exemplary embodiment.

Next, an operation of the image processing apparatus 100 according to the present exemplary embodiment will be described with reference to FIGS. 5 to 7. The CPU 101 of the image processing apparatus 100 reads out the program read out from the ROM 102 into the RAM 103 and executes the program, by which each of steps illustrated in FIGS. 5 to 7 is realized. However, the image processing apparatus 100 may be configured to realize a part of the steps by means of hardware.

First, processing for switching the operation according to whether the image processing apparatus 100 is in a state that the user authentication thereby has succeeded will be described with reference to FIG. 5.

In step S501, the image processing apparatus 100 determines whether the image processing apparatus 100 is in the state that the user authentication has succeeded (hereinafter referred to as an "authenticated state"). The authenticated state refers to, for example, such a state that the user authentication has succeeded and the user is logging into the image processing apparatus 100. However, in the present exemplary embodiment, the authenticated state does not necessarily have to be accompanied by the user's login and the image processing apparatus 100 can be determined to be in the authenticated state as long as the user authentication has succeeded.

If the image processing apparatus 100 is in the authenticated state (YES in step S501), in step S502, the image processing apparatus 100 performs processing at the time of the authenticated state. The processing at the time of the authenticated state will be described in detail below with reference to FIG. 6.

On the other hand, if the image processing apparatus 100 is not in the authenticated state (hereinafter referred to as an "unauthenticated state") (NO in step S501), in step S503, the image processing apparatus 100 performs processing at the time of the unauthenticated state. The processing at the time of the unauthenticated state will be described in detail below with reference to FIG. 7.

(Processing at the Time of Authenticated State)

Next, the processing at the time of the authenticated state in step S502 will be described with reference to FIG. 6.

First, in step S601, the operation reception unit 216 of the image processing apparatus 100 determines whether the selection request is received. For example, the operation reception unit 216 determines that the selection request is received if the selection request button 302 is pressed. As described above, the selection request button 302 does not necessarily have to be a hardware key and may be configured to be realized by a software key.

If the selection request is not received (NO in step S601), the operation reception unit 216 repeats the processing in step S601. On the other hand, if the selection request is received (YES in step S601), the display control unit 217 causes the job selection screen 304 to be displayed on the display unit 301. In the present exemplary embodiment, a job that a user other than the user that is logging into the image processing apparatus 100 instructs the image processing apparatus 100 to carry out is also displayed on the job selection screen 304.

Next, in step S603, the operation reception unit 216 receives a job selection made by the user. The user can select an arbitrary job from among the one or more job(s) displayed on the job selection screen 304 by operating the operation button 303. Similarly to the selection request button 302, the operation button 303 does not necessarily have to be a hardware key and may be configured to be realized by a software key.

Next, in step S604, the operation reception unit 216 receives an instruction to cancel execution of the job selected in step S603. For example, the user can instruct the image processing apparatus 100 to cancel the execution of the job by operating the operation button 303.

In step S605, the processing control unit 215 cancels the execution of the selected job according to the cancel instruction. Due to the above-described processing, the authenticated user can cancel the execution of the job. If being in the authenticated state, the image processing apparatus 100 performs the operation described above with reference to FIG. 6 even when the predetermined error has occurred. According to the processing in compliance with FIG. 6, the user (the authenticated user) can resolve the error state by canceling the execution of the job from which the error has occurred. Further, the authenticated user can also instruct the image processing apparatus 100 to cancel the execution with respect to a job from which no error has occurred.

(Processing at the Time of Unauthenticated State)

Next, the processing at the time of the unauthenticated state in step S503 will be described with reference to FIG. 7.

First, in step S701, the operation reception unit 216 of the image processing apparatus 100 determines whether the selection request is received. If the selection request is not received (NO in step S701), the operation reception unit 216 repeats the processing in step S701.

On the other hand, if the selection request is received (YES in step S701), in step S702, the display control unit 217 determines whether the predetermined error has occurred in the image processing apparatus 100. The display control unit 217 can determine whether the predetermined error has occurred by, for example, referring to the error code indicating the type of the error that has occurred in the image processing apparatus 100. The predetermined error is, for example, the sheet size mismatch error or the sheet empty error. The content of the error is not limited to these examples. The predetermined error is defined to be such an error that, unless the execution of the job that has caused the occurrence of the error is canceled, the error is not resolved.

If the predetermined error has not occurred (NO in step S702), the image processing apparatus 100 ends the processing. In other words, at the time of the unauthenticated state, the display control unit 217 does not cause the job selection screen 401 to be displayed when the predetermined error has not occurred, even when the selection request is received. The display control unit 217 may be configured to cause a notification indicating that the selection screen 401 is not displayed, an error notification, or the like to be displayed on the display unit 301 in response to the received selection request, if determining that the predetermined error has not occurred in step S702 (NO in step S702). Alternatively, the display control unit 217 may be configured to notify the user that the selection request cannot be accepted with use of, for example, audio such as an error sound.

If the display control unit 217 determines that the predetermined error has occurred (YES in step S702), the display control unit 217 causes the job selection screen 401 to be displayed on the display unit 301. The job selection screen 401 displays the job list in such a manner that the user can select only a specific job among the one or more job(s) held by the image processing apparatus 100.

The specific job is, for example, the job that has caused the occurrence of the error. The job in progress at the moment that the error has occurred, or the job placed at the head of the queue holding the jobs at the moment that the error has occurred can be displayed on the job selection screen 401 as the specific job.

The display control unit 217 may operate in such a manner that a job other than the specific job is not displayed on the job selection screen 401 or may operate in such a manner that the job is displayed on the job selection screen 401 but cannot be selected thereon. Alternatively, the display control unit 217 may operate in such a manner that the cancel instruction cannot be issued even if the job is selected. In the case where the display control unit 217 operates in such a manner that a job other than the specific job is displayed but cannot be selected or operates in such a manner that the cancel instruction cannot be issued even if the job is selected, a color of the job display may be changed or a mark may be displayed besides the job display so as to allow the user to distinguish the job from the specific job.

After that, the image processing apparatus 100 performs processing similar to the processing from steps S603 to S605 illustrated in FIG. 6. More specifically, in step S704, the operation reception unit 216 receives a job selection made by the user. Next, in step S705, the operation reception unit 216 receives an instruction to cancel execution of the job selected in step S704. Then, in step S706, the processing control unit 215 cancels the execution of the selected job according to the cancel instruction. Due to this processing, even the unauthenticated user can cancel the execution of the job that has caused the occurrence of the error.

In this manner, the instruction to cancel the execution of the job can be issued without the authentication information input if the cancel is attempted for the purpose of resolving the predetermined error that has occurred in the image processing apparatus 100. Therefore, the present configuration prevents the image processing apparatus 100 from undesirably becoming unusable while the user having the authentication information is absent when the error has occurred.

Further, the present configuration can prevent the execution of the job from being canceled in an unauthorized manner for a purpose other than the purpose for resolving the error. The present configuration allows only the job corresponding to the occurrence of the error among the one or more job(s) generated by the image processing apparatus 100 to be selected from the job selection screen 410 if the authentication information is not input, even when the cancel is attempted for the purpose of resolving the predetermined error. Therefore, the present configuration can limit the job cancelable without the authentication information input among the one or more job(s) generated by the image processing apparatus 100, even when the cancel is attempted for the purpose of resolving the predetermined error. For example, the present configuration can allow the job from which the error has occurred to be canceled without the authentication information input but prevent a job other than that from being canceled without the authentication information input.

A second exemplary embodiment will be described as an example in which the image processing apparatus 100 has a mode of refraining from accepting the cancel of the execution of the job if the user authentication has not succeeded even when the above-described predetermined error has occurred, in addition to a mode of performing the processing described in the first exemplary embodiment.

A system configuration is similar to the first exemplary embodiment, and therefore a description thereof will be omitted below. In the present exemplary embodiment, the HDD 104 stores therein a mode setting regarding control of the authority to cancel the job. In the present exemplary embodiment, the image processing apparatus 100 operates in any mode of a Mode 1 and a Mode 2. However, the image processing apparatus 100 may also be configured to have a mode other than them.

The Mode 1 is the mode of performing the processing described with reference to FIGS. 5 to 7 in the first exemplary embodiment. The Mode 2 is the mode of refraining from accepting the cancel of the execution of the job unless the user authentication has succeeded from the authentication information, even when the predetermined error has occurred. A method of refraining from accepting the cancel of the execution of the job is not especially limited. For example, the image processing apparatus 100 may be configured to prohibit the selection screen 401 from being displayed even when the selection request button 302 is pressed, if the user authentication has not succeeded. Alternatively, the image processing apparatus 100 may be configured to prohibit the instruction to cancel the execution of the job from being issued although allowing the selection screen 401 to be displayed, if the user authentication has not succeeded.

Which mode the image processing apparatus 100 should operate in is settable by the user. Alternatively, the image processing apparatus 100 may be configured in such a manner that an administrator user having administrator authority can make the mode setting when inputting predetermined authority information to the image processing apparatus 100.

Figure 8:
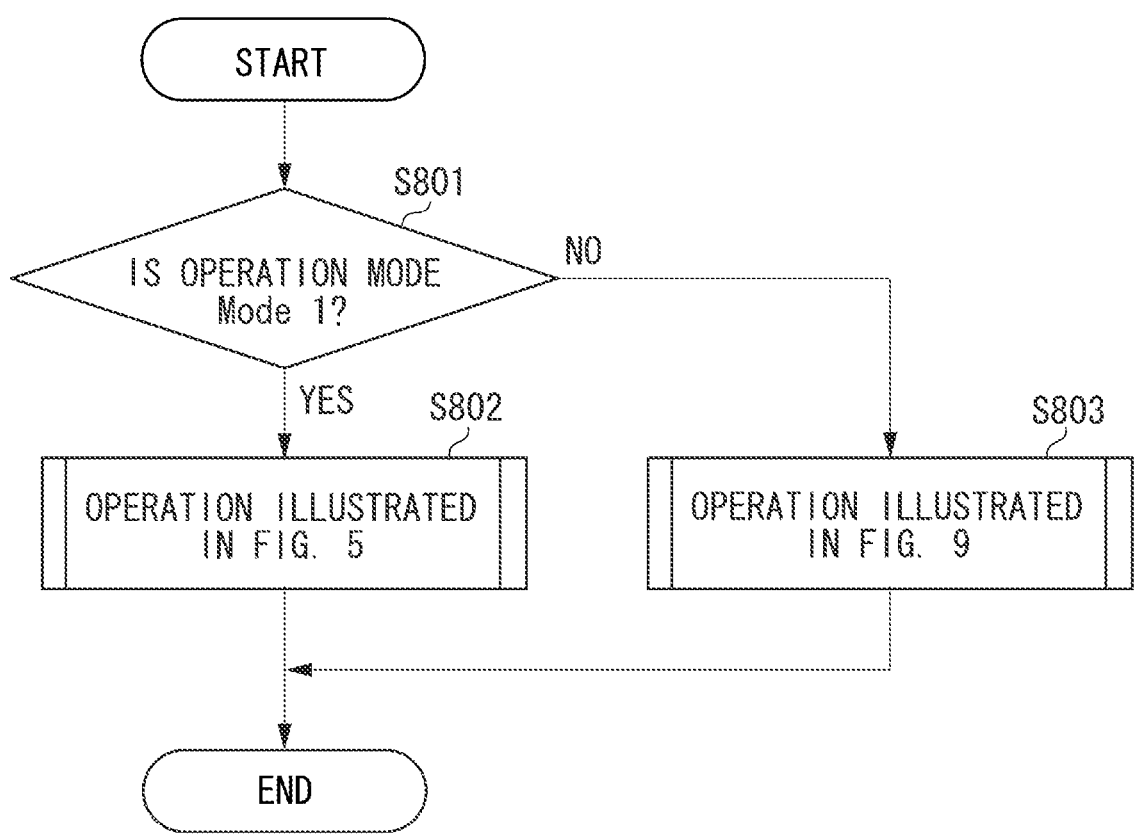
FIG. 8 illustrates a flow of processing to be performed by the image processing apparatus according to a second exemplary embodiment.
Figure 9:
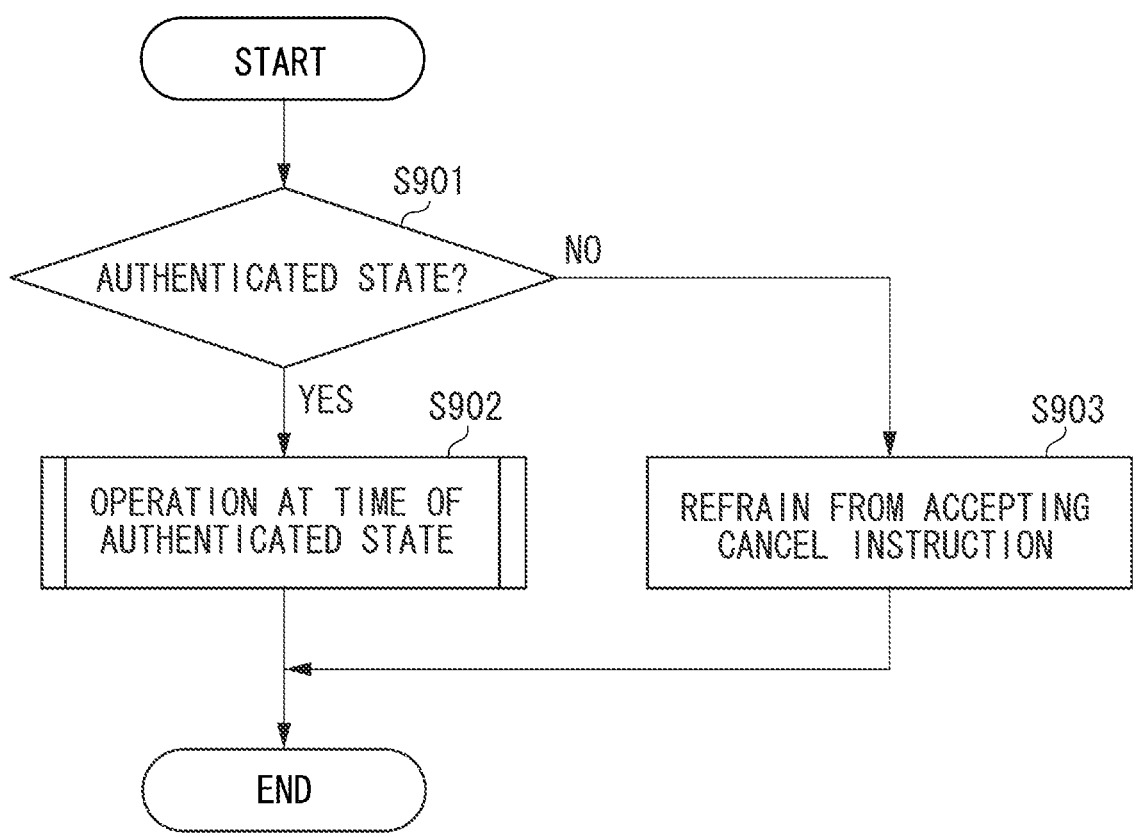
FIG. 9 illustrates a flow of processing to be performed by the image processing apparatus in a Mode 2 according to the second exemplary embodiment.

Processing performed by the image processing apparatus 100 according to the present exemplary embodiment will be described with reference to FIGS. 8 and 9. The CPU 101 of the image processing apparatus 100 reads out the program read out from the ROM 102 into the RAM 103 and executes the program, by which each of steps illustrated in FIGS. 8 and 9 is realized. However, the image processing apparatus 100 may be configured to realize a part of the steps by means of hardware.

Processing for determining the mode according to the present exemplary embodiment will be described with reference to FIG. 8. In step S801, the CPU 101 confirms the mode setting stored in the HDD 104 to determine whether the mode setting is the Mode 1 or the Mode 2.

If the operation mode of the image processing apparatus 100 is determined to be the Mode 1 as a result of the determination (YES in step S801), in step S802, the image processing apparatus 100 performs the processing described with reference to FIGS. 5 to 7. On the other hand, if the operation mode of the image processing apparatus 100 is the Mode 2 (NO in step S801), in step S803, the image processing apparatus 100 operates so as to refrain from accepting the cancel of the execution of the job unless the user authentication has succeeded from the authentication information.

The processing in step S803 will be described with reference to FIG. 9. In step S901, the image processing apparatus 100 determines whether the image processing apparatus 100 is in the authenticated state.

If the image processing apparatus 100 is in the authenticated state (YES in step S901), the image processing apparatus 100 performs the processing described with reference to FIG. 6. On the other hand, if the image processing apparatus 100 is in the unauthenticated state (NO in step S901), the image processing apparatus 100 operates so as to refrain from accepting the cancel of the execution of the job unless the user authentication has succeeded from the authentication information. In other words, if the predetermined setting is made to the image processing apparatus 100, the image processing apparatus 100 performs control of refraining from accepting the instruction to cancel the execution of the job if the authority information is not input, even when the predetermined error has occurred.

By setting the desired mode, the user or the administrator user can switch whether to set the image processing apparatus 100 so as to be able to return from the error state even while the user having the authentication authority is absent or set the image processing apparatus 100 so as to prohibit the user having no authentication authority from canceling the job at all according to how the system is operated.

According to the configuration described in the first or second exemplary embodiment, the instruction to cancel the execution of the job can be issued without the authority information input if the cancel is attempted for the purpose of resolving the predetermined error that has occurred in the image processing apparatus 100.

Further, according to the configuration described in the first or second exemplary embodiment, the execution of the job can be prevented from being canceled in an unauthorized manner except for the cancel attempted for the purpose of resolving the error.

Further, according to the configuration described in the first or second exemplary embodiment, the image processing apparatus 100 can limit the job cancelable without the authority information input among the one or more job(s) generated by the image processing apparatus 100, even when the cancel is attempted for the purpose of resolving the predetermined error.

Other Embodiments

Some embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims the benefit of Japanese Patent Application No. 2017-033707, filed Feb. 24, 2017, which is hereby incorporated by reference herein in its entirety.

What is claimed is:

1. An image processing apparatus comprising:
   a memory device that stores a set of instructions; and
   at least one processor that executes the set of instructions to
      accept an instruction to perform an image processing job and authority information before canceling the image processing job,
      generate the image processing job based on the instruction to perform the image processing job,
      allow a user to log in to the image processing apparatus based on the authority information,
      cancel the image processing job in response to accepting an instruction to cancel the image processing job after the user logs in to the image processing apparatus, and
      in a case where a predetermined error has occurred and where the user is not logged in to the image processing apparatus,
         display a screen for accepting an instruction to cancel a predetermined image processing job,
         accept, via the screen, the instruction to cancel the predetermined image processing job, and
         cancel the predetermined image processing job in response to accepting the instruction to cancel the predetermined image processing job.

2. The image processing apparatus according to claim 1, wherein the at least one processor executes the set of instructions to
   receive a display instruction to display a selection screen usable for a user to select at least one job among a plurality of jobs, wherein the plurality of jobs includes the image processing job,
   in a case where the display instruction is received during execution of the image processing job and where the predetermined error has not occurred, perform control of allowing the image processing job to be selected via the selection screen on condition that the authority information has been received,
   in a case where the display instruction is received during the execution of the image processing job, where the predetermined error has occurred, and where the authority information has not been received, perform control of allowing the image processing job to be selected via the selection screen without allowing any other jobs of the plurality of jobs to be selected via the selection screen, and
   cancel any job selected via the selection screen.

3. The image processing apparatus according to claim 1, wherein the predetermined error occurred during execution of the image processing job.

4. The image processing apparatus according to claim 1, wherein the image processing job is positioned at a head of a job queue held by the image processing apparatus.

5. The image processing apparatus according to claim 1, wherein the at least one processor executes the set of instructions to, in a case where a predetermined setting is set to the image processing apparatus, perform control of refraining from accepting the instruction to cancel the image processing job in the case where the predetermined error has occurred and where the authority information has not been received.

6. The image processing apparatus according to claim 1,
   wherein the predetermined error occurred during execution of the image processing job, and
   wherein resolving the predetermined error requires canceling the image processing job.

7. The image processing apparatus according to claim 1,
   wherein the predetermined error occurred during execution of the image processing job, and
   wherein the predetermined error includes at least one of: a sheet size mismatch error, in which a size of a sheet required to carry out the image processing job and a size of a sheet that the image processing apparatus can feed do not match each other, and a sheet empty error.

8. A method for controlling an image processing apparatus, the method comprising:
   accepting an instruction to perform an image processing job and authority information before canceling the image processing job;
   generating the image processing job based on the instruction to perform the image processing job;
   allowing a user to log in to the image processing apparatus based on the authority information;
   canceling the image processing job in response to accepting an instruction to cancel the image processing job after allowing the user to loci in to the image processing apparatus, and
   in a case where a predetermined error has occurred and where the user is not logged in to the image processing apparatus,
      displaying a screen for accepting an instruction to cancel a predetermined image processing job;
      accepting, via the screen, the instruction to cancel the predetermined image processing job; and canceling the predetermined image processing job in response to accepting the instruction to cancel the predetermined image processing job.

9. A non-transitory computer readable storage medium storing a program for causing a processor to execute a method of controlling an image processing apparatus, the method comprising:
accepting an instruction to perform an image processing job and authority information before canceling the image processing job;
generating the image processing job based on the instruction to perform the image processing job;
allowing a user to log in to the image processing apparatus based on the authority information;
canceling the image processing job in response to accepting an instruction to cancel the image processing job after the user logs in to the image processing apparatus; and
in a case where a predetermined error has occurred and where the user is not logged in to the image processing apparatus,
displaying a screen for accepting an instruction to cancel a predetermined image processing job;
accepting, via the screen, the instruction to cancel the predetermined image processing job; and
canceling the predetermined image processing job in response to accepting the instruction to cancel the predetermined image processing job.

10. An image processing apparatus comprising:
a memory device that stores a set of instructions; and
at least one processor that executes the set of instructions to
accept an instruction to perform a first image processing job and first authority information before canceling the first image processing job,
generate the first image processing job based on the instruction to perform the first image processing job,
receive second authority information, different from the first authority information, corresponding to a second image processing job different from the first image processing job,
allow a user to log in to the image processing apparatus based on the second authority information,
canceling the second image processing job in response to accepting an instruction to cancel the second image processing job after the user logs in to the image processing apparatus based on the second authority information, and
in a case where a predetermined error has occurred during execution of the first image processing job and where the user logs in to the image processing apparatus based on the second authority information, accept an instruction to cancel the execution of the first image processing job, and
cancel the execution of the first image processing job in response to accepting the instruction to cancel the execution of the first image processing job.

11. The image processing apparatus according to claim 1, wherein receipt of the authority information is satisfied by receipt of either user authority information corresponding to the image processing job or administrator authority information.

12. The image processing apparatus according to claim 1, wherein the at least one processor executes the set of instructions to
receive second authority information, different from the authority information, for executing a second image processing job that is different from the image processing job, and
wherein accepting, via the screen, the instruction to cancel the image processing job is performed on condition that the second authority information has been received.

13. The image processing apparatus according to claim 12, wherein the second authority information does not include administrator authority information.

14. The image processing apparatus according to claim 1, wherein the information indicating that the authority information must be received before canceling the first image processing job includes a username and password.

15. The image processing apparatus according to claim 14, wherein receipt of the authority information is satisfied by either of receipt of the username and password or receipt of administrator authority information.

16. The image processing apparatus according to claim 10, wherein the second authority information does not include administrator authority information.

17. The image processing apparatus according to claim 1, wherein the predetermined image processing job canceled according to the instruction of the user who is not logged into the image processing apparatus is a job for which the predetermined error has occurred.

* * * * *